(12) United States Patent
Yang et al.

(10) Patent No.: US 12,101,697 B2
(45) Date of Patent: Sep. 24, 2024

(54) SERVICE PROCESSING METHOD AND APPARATUS, AND INTERNET OF VEHICLES DEVICE

(71) Applicant: ZTE CORPORATION, Guangdong (CN)

(72) Inventors: Dan Yang, Guangdong (CN); Nan Li, Guangdong (CN); Bo Sun, Guangdong (CN); Zhiqiang Han, Guangdong (CN); Ning Wei, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 406 days.

(21) Appl. No.: 17/615,383

(22) PCT Filed: May 26, 2020

(86) PCT No.: PCT/CN2020/092235
§ 371 (c)(1),
(2) Date: Nov. 30, 2021

(87) PCT Pub. No.: WO2020/238880
PCT Pub. Date: Dec. 3, 2020

(65) Prior Publication Data
US 2022/0232355 A1 Jul. 21, 2022

(30) Foreign Application Priority Data
May 31, 2019 (CN) .......................... 201910472871.6

(51) Int. Cl.
*H04W 4/20* (2018.01)
*H04L 5/00* (2006.01)
(Continued)

(52) U.S. Cl.
CPC ............. *H04W 4/20* (2013.01); *H04L 5/0053* (2013.01); *H04L 67/12* (2013.01); *H04W 72/044* (2013.01); *H04W 4/40* (2018.02)

(58) Field of Classification Search
CPC ....... H04W 4/20; H04W 72/044; H04W 4/40; H04L 5/0053; H04L 67/12; H04L 69/06; H04L 5/0092; H04L 65/40
(Continued)

(56) References Cited

U.S. PATENT DOCUMENTS

2006/0107287 A1 5/2006 Lee et al.
2011/0110462 A1* 5/2011 Lee .................... H04N 21/4382
375/321
(Continued)

FOREIGN PATENT DOCUMENTS

| CN | 1874434 A | 12/2006 |
|---|---|---|
| CN | 102448178 A | 5/2012 |

(Continued)

OTHER PUBLICATIONS

China Patent Office, First Office Action dated Jul. 1, 2022, for corresponding Chinese application 201910472871.6.
(Continued)

*Primary Examiner* — Don N Vo
(74) *Attorney, Agent, or Firm* — Li & Cai Intellectual Property (USA) Office

(57) ABSTRACT

Disclosed by the present application are— a service processing method and apparatus, and an Internet of Vehicles device. The service processing method including: carrying, by a first device, indication information in a signaling part of a data packet, the indication information indicating that a first service is borne in a data part of the data packet; and transmitting the data packet through the first device.

20 Claims, 4 Drawing Sheets

(51) Int. Cl.
*H04L 67/12* (2022.01)
*H04W 72/044* (2023.01)
*H04W 4/40* (2018.01)

(58) Field of Classification Search
USPC .................................................. 455/414.1
See application file for complete search history.

(56) References Cited

U.S. PATENT DOCUMENTS

| | | |
|---|---|---|
| 2013/0012253 A1 | 1/2013 | Yamamoto |
| 2017/0066310 A1 | 3/2017 | Chung |
| 2017/0324657 A1 | 11/2017 | Zhong et al. |
| 2018/0249404 A1 | 8/2018 | Kumabe et al. |
| 2018/0279068 A1 | 9/2018 | Yamashiro et al. |
| 2018/0279322 A1* | 9/2018 | Pang ............... H04W 72/56 |
| 2019/0191485 A1* | 6/2019 | Takahashi .......... H04W 80/04 |
| 2020/0229096 A1* | 7/2020 | Atefi ............... H04W 28/02 |

FOREIGN PATENT DOCUMENTS

| | | |
|---|---|---|
| CN | 104918228 A | 9/2015 |
| CN | 106331038 A | 1/2017 |
| CN | 107005812 A | 8/2017 |
| CN | 108023705 A | 5/2018 |
| CN | 107005812 B | 3/2020 |
| JP | 6394539 B2 | 9/2018 |
| WO | WO2011111282 A1 | 9/2011 |
| WO | WO2018124320 A1 | 7/2018 |
| WO | WO2018128209 A1 | 7/2018 |

OTHER PUBLICATIONS

European Patent Office, extended European Search Report dated Jun. 5, 2023, for corresponding EP application No. 20814651.4.
Jong-Moon Chung et al."Time Coordinated V2 Communications and Handover for WAVE Networks"IEEE Journey On Selected Areas in Communications. Mar. 1, 2011.
WIPO, International Search Report issued on Jul. 28, 2020.

* cited by examiner

SERVICE PROCESSING METHOD AND APPARATUS, AND INTERNET OF VEHICLES DEVICE

CROSS-REFERENCE TO RELATED APPLICATIONS

The present application claims priority from the Chinese patent application No. 201910472871.6 filed with the China Patent Office on May 31, 2019, the entire contents of which are incorporated in the present application by reference.

TECHNICAL FIELD

The present application relates to, but is not limited to, vehicular communication network technology, and particularly relates to a service processing method and apparatus, and an Internet of Vehicles (IoV) device.

BACKGROUND

In the existing vehicular communication network technology, an Internet of Vehicles device may play two roles: a provider and a user. As the provider, the Internet of Vehicles device transmits a service notification message; and as the user, the Internet of Vehicles device receives the service notification message and receives service data according to the service notification message.

Taking division of channels in the related Internet of Vehicles system as an example, as shown in FIG. 1, the operating frequency is near 5 GHz, a bandwidth of 75 MHz is divided into seven channels of 10 MHz, and a bandwidth of 5 MHz with the lowest frequency is reserved as a safety margin. CH178 is a Control Channel (CCH) configured to transmit service notification messages and other control messages; and the other 6 channels are Service Channels (SCHs), in which CH172 and CH184 are configured to transmit service data.

The service notification message transmitted from the provider on the control channel carries a channel number of the service channel where the service is located; and after receiving the service notification message, the user receives the corresponding service on the corresponding channel. The provider transmits data packets including the service on the control channel or service channel in a channel access manner of Enhanced Distributed Channel Access (EDCA).

With the development of the Internet of Vehicles technology, automatic driving, map-aided functions and the like gradually gain popularization. Data volume involved in vehicular services constantly increases, and the requirements on bandwidth are increasing. In the future, the channel bandwidth of an Internet of Vehicles device may be expanded to be larger than 10 MHz, for example 20 MHz, and even 40 MHz, and the adopted method may involve the combined use of a plurality of continuous or discontinuous 10 MHz bandwidths in aggregation. However, no solution has been proposed yet regarding channel access on such larger bandwidth in the related art. Multiple providers or the same provider may broadcast, in one or more service notification messages, one or more services presented on a channel of a certain 10 MHz or 20 MHz, or even larger bandwidth. That is, there may be more than one services transmitted on the same channel. For example, as shown in FIG. 2, assuming that there are three Internet of Vehicles devices in the network, namely, device 1, device 2, and device 3, and the positional relationship of the three devices is as shown in FIG. 2. Assuming that device 1 wants to receive service 2 from device 2, while device 3, which is mutual invisible with respect to device 2, also transmits service 3 on the same channel, and device 1 can receive service 3 transmitted from device 3. If device 1 receives service 3 first, since device 1 needs to receive and decode service 3 completely before knowing whether service 3 is a service of interest, as shown in FIG. 3, when service 2 reaches device 1, device 1 is busy with receiving or decoding service 3, and thus may miss receiving service 2 which is of interest.

That is, for the receiver device 1, it cannot distinguish the current service or correctly receive the desired service, which may further cause problems such as reduced channel access efficiency and thus a delay in service transmission.

SUMMARY

The present application provides a service processing method and apparatus, and an Internet of Vehicles device which can guarantee that a service receiver correctly receives the desired service.

The present application provides a service processing method, including:
  carrying, by a first device, indication information in a signaling part of a data packet, the indication information indicating that a first service is borne in a data part of the data packet; and
  transmitting the data packet through the first device.

In an illustrative example, the indication information includes any one or any combination of:
  channel information, service identity information, partial service identity information, device identity information, and partial device identity information.

In an illustrative example, the indication information includes channel information configured to indicate a channel number of a service channel where the first service is located or the service channel.

In an illustrative example, when the indication information includes service identity information, the service identity information is: a service identity of the first service; or,
  when the indication information includes partial service identity information, the partial service identity information is generated from the service identity of the first service; or,
  when the indication information includes device identity information, the device identity information is a device identity of the first device; or,
  when the indication information includes partial device identity information, the partial device identity information is generated from the device identity of the first device.

In an illustrative example, the first service and the information on the service channel where the first service is located are acquired through a higher layer service notification message.

In an illustrative example, the signaling part of the data packet further carries: bandwidth information configured to indicate a transmission bandwidth or a transmission channel used by the data part of the data packet.

In an illustrative example, the method further includes:
  transmitting, by the first device, a first higher layer service notification message; wherein the first higher layer service notification message carries a service identity of the first service, and a channel number of a service channel where the first service is located; and
  the first higher layer service notification message further carries: full bandwidth or partial bandwidth transmission indication configured to indicate whether the data packet bearing the first service is transmitted on full bandwidth or partial bandwidth of the service channel of the first service.

In an illustrative example, the method further includes: transmitting, by the first device, a first higher layer service notification message; wherein the first higher layer service notification message carries a service identity of the first service, and a channel number of a service channel where the first service is located; and the first higher layer service notification message further carries: primary channel information configured to indicate a primary channel of the service channel where the first service is located.

The present application further provides a computer-readable storage medium with computer executable instructions stored thereon, wherein the computer executable instructions are configured to cause any of the above service processing methods to be implemented.

The present application further provides an apparatus for implementing service processing, including a processor and a memory, wherein the memory has stored thereon a computer program operable on the processor to: cause any of the above service processing methods to be implemented.

The present application further provides a service processing method, including:
receiving a data packet by a second device; and
determining, by the second device according to indication information carried in a signaling part of the data packet, whether the data packet bears a second service or not.

In an illustrative example, before receiving the data packet by the second device, the method further includes:
receiving, by the second device, a second higher layer service notification message; and
acquiring, according to the received second higher layer service notification message, a service identity of the second service, and a channel number of the service channel where the second service is located.

In an illustrative example, the indication information includes any one or any combination of:
channel information, service identity information, partial service identity information, device identity information, and partial device identity information.

In an illustrative example, when the indication information includes channel information, the channel information is configured to indicate a service channel where the service borne in the data packet is located or a channel number of the service channel; or,
when the indication information includes service identity information, the service identity information is a service identity of the service borne in the data packet; or,
when the indication information includes partial service identity information, the partial service identity information is generated from the service identity of the service borne in the data packet; or,
when the indication information includes device identity information, the device identity information notifies of a device identity of a device for the service borne in the data packet; or,
when the indication information includes partial device identity information, the partial device identity information is generated by notifying of the device identity of the device for the service borne in the data packet.

In an illustrative example, determining, according to indication information carried in the signaling part of the data packet, that the data packet bears a second service includes:
determining, under the condition that the channel or channel number indicated by the indication information is the same as the service channel or channel number of the service channel where the second service is located, that the data packet bears the second service; or,
determining, under the condition that the service identity or partial service identity indicated by the indication information is the same as or matched with the service identity of the second service, that the data packet bears the second service; or,
determining, under the condition that the device identity or partial device identity indicated by the indication information is the same as or matched with the device identity of the device transmitting the second service, that the data packet bears the second service.

In an illustrative example, determining, according to indication information carried in the data packet, that the data packet does not bear a second service includes:
determining, under the condition that the channel or channel number indicated by the indication information is not the same as the service channel or channel number of the service channel where the second service is located, that the data packet does not bear a second service; and or,
determining, under the condition that the service identity or partial service identity indicated by the indication information is not the same as or not matched with the service identity of the second service, that the data packet does not bear a second service; and or,
determining, under the condition that the device identity or partial device identity indicated by the indication information is not the same as or not matched with the device identity of the device transmitting the second service, that the data packet does not bear a second service.

In an illustrative example, the signaling part of the data packet further carries bandwidth information, and the data part of the data packet is received on a transmission bandwidth or transmission channel indicated by the bandwidth information.

In an illustrative example, after determining, by the second device according to indication information carried in the data packet, that the data packet does not bear a second service, the method further includes: ending processing of the data packet; wherein
ending the processing of the data packet includes:
stopping reception or decoding of the data packet;
or, discarding the data packet;
or, the second device resetting a reception mode thereof or recapturing a new data packet.

In an illustrative example, after determining, by the second device according to indication information carried in the data packet, that the data packet bears a second service, the method further includes:
continuing reception or decoding of the rest part of the data packet, and determining again whether the data packet bears the second service according to information in the rest part of the data packet.

In an illustrative example, the information in the rest part of the data packet includes: a service identity corresponding to a service borne in the data packet; and determining whether the data packet bears the second service according to information in the rest part of the data packet includes:

determining, if the service identity in the rest part of the data packet is the same as the service identity of the second service, that the data packet bears the second service; and determining, if the service identity in the rest part of the data packet is not the same as the service identity of the second service, that the data packet does not bear a second service.

The present application further provides a computer-readable storage medium with computer executable instructions stored thereon, wherein the computer executable instructions are configured to cause any of the above second service processing methods to be implemented.

The present application further provides an apparatus for implementing service processing, including a processor and a memory, wherein the memory has stored thereon a computer program operable on the processor to: cause any of the above second service processing methods to be implemented.

The present application further provides an Internet of Vehicles device, including: a first processing module and a transmitting module; wherein the first processing module is configured to carry indication information in a signaling part of a data packet, the indication information indicating that a first service is borne in a data part of the data packet; and the transmitting module is configured to transmit the data packet.

The present application further provides an Internet of Vehicles device, including: a receiving module and a second processing module; wherein the receiving module is configured to receive a data packet; and the second processing module is configured to determine, according to indication information carried in a signaling part of the data packet, whether the data packet bears a second service or not.

In an illustrative example, the second processing module is specifically configured to:

determine, under the condition that the indication information carried in the received data packet is not consistent with information of the second service, that the data packet does not bear a second service; and determine, under the condition that the indication information carried in the received data packet is consistent with information of the second service, that the data packet bears the second service.

The present application further provides an Internet of Vehicles device, including: a first processing module, a transmitting module, a receiving module and a second processing module; wherein the first processing module is configured to carry indication information in a signaling part of a data packet, the indication information indicating that a first service is borne in a data part of the data packet; and the transmitting module is configured to transmit the data packet;

the receiving module is configured to receive a data packet; and the second processing module is configured to determine, according to indication information carried in a signaling part of the data packet, whether the data packet bears a second service or not.

The present application further provides a service processing method, including:

carrying, by a device in a higher layer service notification message, full bandwidth or partial bandwidth transmission indication, the configured to indicate that a service bearing the higher layer service notification is transmitted on full bandwidth or partial bandwidth of a service channel thereof.

The present application further provides a service processing method, including:

carrying, by a device in a higher layer service notification message, primary channel information configured to indicate a primary channel of a service channel, a service notified in the higher layer service notification message being located in the service channel.

By carrying in a data packet indication information indicating a service borne in the data packet, the present application achieves correct differentiation of the current service and guarantees that a service receiver correctly receives the desired service.

Other features and advantages of the disclosure will be set forth in the description which follows, and will become apparent from the description at least partially, or be understood by implementing the disclosure. Objects and other advantages of the disclosure may be realized and obtained by means of the structures particularly pointed out in the description, appended claims and drawings.

BRIEF DESCRIPTION OF DRAWINGS

Accompanying drawings are provided for further understanding of the technical solution of the present application and constitute a part of the specification. Hereinafter, these drawings are intended to explain the technical solution of the present application together with the following embodiments, but should not be considered as a limitation to the technical solution of the present application.

DETAIL DESCRIPTION OF EMBODIMENTS

In a typical configuration of the present application, a computing device includes one or more processors (CPUs), an input/output interface, a network interface, and a memory.

The memory may include a volatile memory, a Random Access Memory (RAM), and/or a nonvolatile memory such as Read-Only Memory (ROM) or flash RAM in a computer-readable medium. Memory is an example of the computer-readable medium.

The computer-readable medium includes a persistent or non-persistent, removable or non-removable medium that can realize information storage in any method or by any technique. The information may be computer-readable signaling, data structures, program modules, or other data. Examples of the computer storage medium include, but are not limited to, Phase Change RAM (PRAM), Static RAM (SRAM), Dynamic RAM (DRAM), other types of RAM, Read-Only Memory (ROM), Electrically Erasable Programmable Read-Only Memory (EEPROM), flash memory or other memory technology, Compact Disc-ROM (CD-ROM), Digital Video Disc (DVD) or other optical storage, magnetic cassettes, tape disk storage or other magnetic storage devices, or any other non-transmission medium, which can be configured to store information that can be accessed by a computing device. As defined herein, the computer-readable medium does not include non-transitory computer-readable media (transitory media) such as modulated data signals and carrier waves.

For clarity and better understanding of the objects, technical solutions and advantages of the present application, embodiments of the present application will now be described in detail in conjunction with the accompanying drawings. It should be noted that the embodiments of the present application and features therein may be combined with each other in any manner as long as they are not contradictory.

Figure 4:
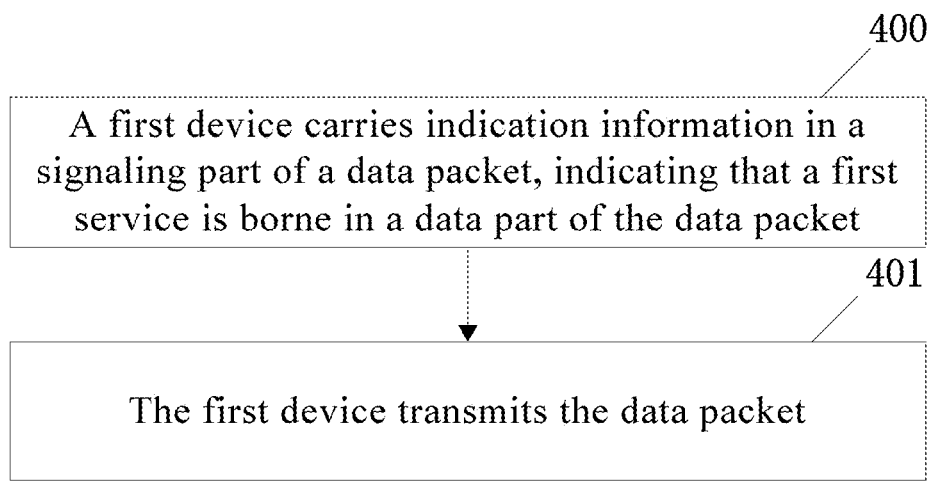
FIG. 4 is a flowchart of an embodiment of a service processing method according to the present application.

FIG. 4 is a flowchart of an embodiment of a service processing method according to the present application. As shown in FIG. 4, the method includes the following operations 400 to 401.

At operation 400: a first device carries indication information in a signaling part of a data packet, indicating that a first service is borne in a data part of the data packet.

In an illustrative example, the indication information may include any one or any combination of:

channel information, service identity information, partial service identity information, device identity information, and partial device identity information.

In an illustrative example, the data packet further contains bandwidth information, indicating a transmission bandwidth used by the data part of the data packet.

In an illustrative example, the channel information is configured to indicate a service channel where the first service is located or a channel number of the service channel where the first service is located.

In an illustrative example, the first service and information on the service channel where the first service is located may be acquired through a higher layer service notification message.

In an illustrative example, the service identity information is: a service identity of the first service.

In an illustrative example, the partial service identity information may be generated from the service identity of the first service. At this time, it is considered that the partial service identity information is matched with the service identity of the first service. It should be noted here that the generation may be implemented by a method in the related art, for example, generating the partial service identity from the service identity of the first service through a functional relationship, or determining the partial service identity to be Lower N bits or higher N bits (N is an integer value) of the service identity of the first service, or the like. The specific generation method is not intended to limit the protection scope of the present application, and is not elaborated here.

In an illustrative example, the device identity information is: a device identity of the first device.

In an illustrative example, the partial device identity information may be generated from the device identity of the first device. At this time, it is considered that the partial device identity information is matched with the identity of the first device. It should be noted here that the generation may be implemented by a method in the related art, for example, generating the partial device identity from the device identity of the first device through a functional relationship, or determining the partial device identity to be lower N bits or higher N bits (N is an integer value) of the device identity of the first device, or the like. The specific generation method is not intended to limit the protection scope of the present application, and is not elaborated here.

At operation 401: the first device transmits the data packet.

In an illustrative example, the service processing method of the present application further includes:

the first device transmits a first higher layer service notification message, the first higher layer service notification message carrying a service identity of the first service, and a channel number of the service channel where the first service is located.

In the service processing method of the present application as shown in FIG. 4, by carrying in a data packet transmitted from the Internet of Vehicles device indication information which indicates a first service borne in the data packet, it is guaranteed that the device receiving the data packet can correctly distinguish the current services and thus correctly receive the desired service, thereby ensuring that the service receiver correctly receives the desired service.

An embodiment of the present disclosure further provides a computer-readable storage medium with computer executable instructions stored thereon. The computer executable instructions are configured to cause any of the above service processing methods described with reference to FIG. 4 to be implemented.

An embodiment of the present disclosure further provides an apparatus for implementing service processing, including a processor and a memory. The memory has stored thereon a computer program executable on the processor and configured to: cause any of the above service processing methods described with reference to FIG. 4 to be implemented.

Figure 1:
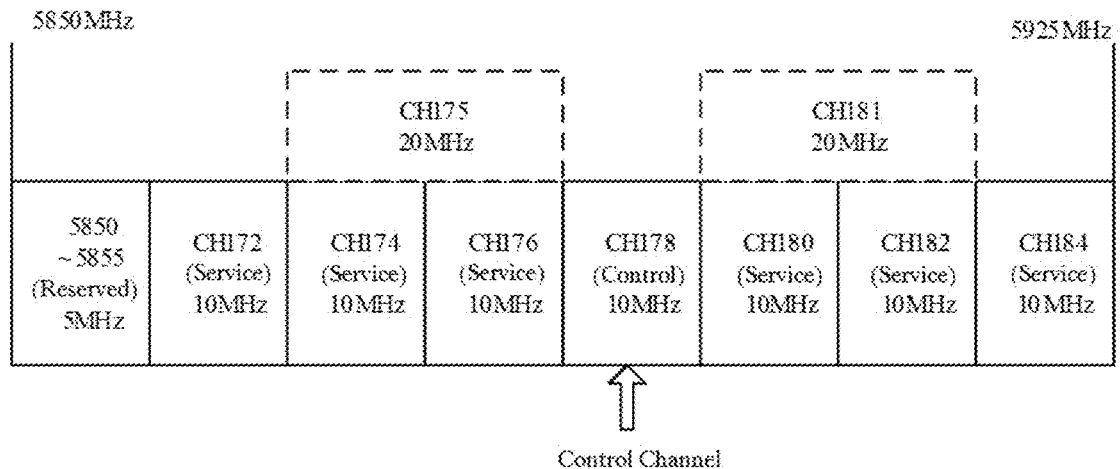
FIG. 1 is a schematic diagram of Internet of Vehicles channel division in the related art.
Figure 2:
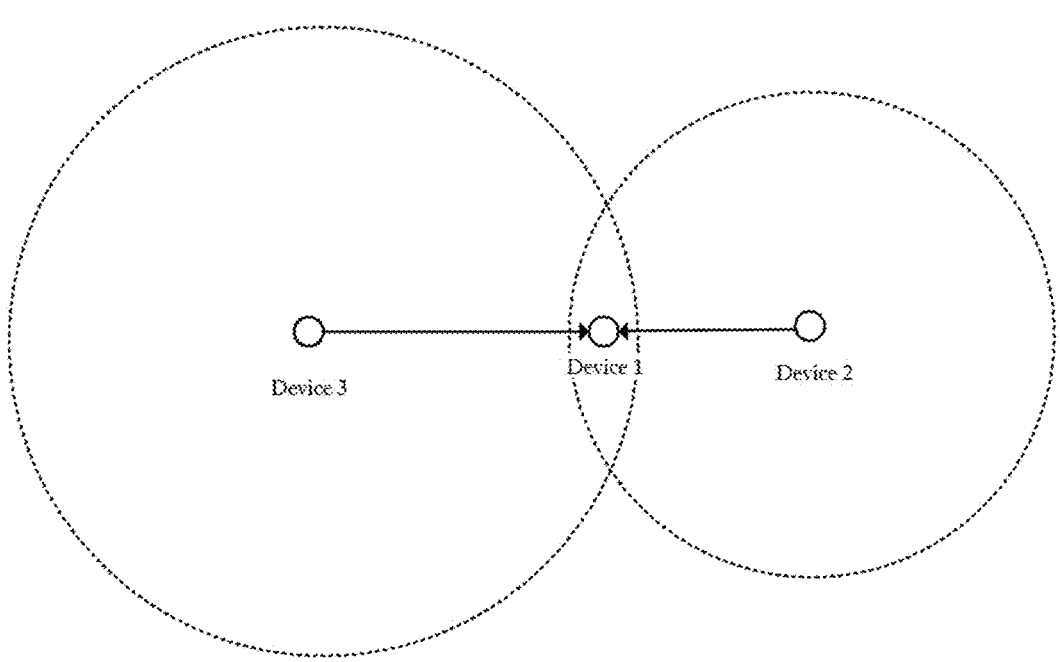
FIG. 2 is a position schematic diagram when there are multiple Internet of Vehicles devices in a network in the related art.
Figure 3:
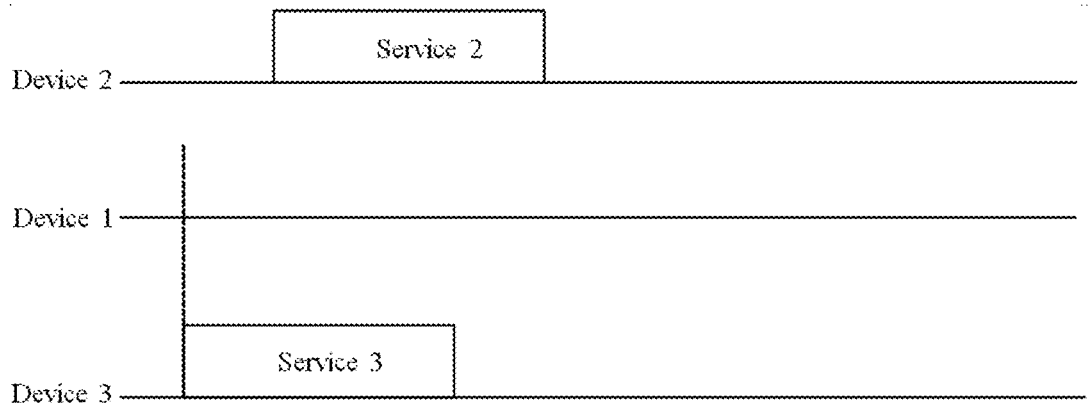
FIG. 3 is a transmission sequences schematic diagram when there are multiple Internet of Vehicles devices in a network in the related art.

In channel division of the Internet of Vehicles, the newly divided channels of 20 MHz bandwidth, such as channels CH175 and CH181 shown in FIG. 1 and the like, are allowed for use by the Internet of Vehicles devices. When the channel division supports 20 MHz (bandwidth), in the related art, a Wireless Access in Vehicular Environments (WAVE) device is allowed to access the channel with a channel access manner such as EDCA when the whole 20 MHz is idle. However, only when the whole 20 MHz is idle, it is possible to access the channel to transmit a corresponding service, which obviously reduce the channel access efficiency and thus causes a delay in service transmission. In order to reduce the delay and considering backward compatibility, the inventor of the present application proposes: if, when a certain 10 MHz channel in the 20 MHz is idle, the WAVE device is allowed to access the channel on the idle 10 MHz to transmit the corresponding service, then the channel access efficiency can be improved, and the delay in service transmission can be reduced.

In an illustrative example, the first higher layer service notification message further carries: full bandwidth or partial bandwidth transmission indication configured to indicate that the first service or the data packet bearing the first service is transmitted on full bandwidth or partial bandwidth (i.e., a part of the full bandwidth) of the service channel where the first service is located. Further, when the full bandwidth transmission indication indicates transmitting on a partial channel, the data packet bearing the first service may be transmitted on a partial channel bandwidth of the channel corresponding to the channel number of the service channel where the first service is located, which channel number is notified in the first higher layer service notification message.

In an illustrative example, when the full bandwidth transmission indication is set to a, it indicates that the data packet bearing the first service is transmitted in a full bandwidth manner on the service channel where the first service is located; when the full bandwidth transmission indication is set to b, it indicates that the data packet bearing the first service is allowed to be transmitted on a partial channel bandwidth of the service channel of the first service. For example, if the channel number of the service channel of service 1 is CH1, and CH1 has a bandwidth of 20 MHz, when the full bandwidth transmission indication is set to b, the data packet bearing service 1 is allowed to be transmitted on a partial bandwidth of CH1, that is, on a certain 10 MHz bandwidth of CH1.

Figure 5:
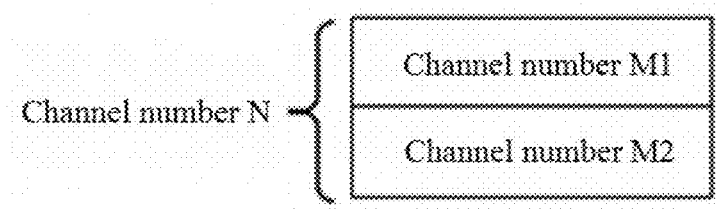
FIG. 5 is a schematic diagram showing an embodiment in which one channel number corresponds to multiple channels according to the present application.

In an illustrative example, assuming that the first higher layer service notification message indicates a channel number N of the service channel where service 1 is located, the channel division diagram of the channel corresponding to the channel number N and channel division of the channels corresponding to a channel number M1 and a channel number M2 is as shown in FIG. 5, where the channel corresponding to the channel number M1 occupies a part of the bandwidth of the channel corresponding to the channel number N, and the channel corresponding to the channel number M2 occupies another part of the bandwidth of the channel corresponding to the channel number N. For example: the channel corresponding to the channel number N has a bandwidth of 20 MHz, the channel corresponding to the channel number M1 has a bandwidth of 10 MHz, and the channel corresponding to the channel number M2 has a bandwidth of 10 MHz. It should be noted that the channels corresponding to the channel number M1 and the channel number M2 may be continuous or discontinuous.

The service channel where the service is located may include one or more channels of e.g., 10 MHz bandwidth. Therefore, when the service channel includes a plurality of channels of 10 MHz bandwidth, the inventor of the present application proposes: one of the channels of 10 MHz bandwidth may be designated as a primary channel.

In an illustrative example, the first higher layer service notification message of the present application further carries: primary channel information configured to indicate a primary channel of a service channel where the first service is located. The primary channel is a common channel between the first device and a receiver receiving the data packet bearing the first service.

For example: device 1 indicates, in the higher layer service notification message, that the channel number of the service channel where service 1 is located is N, and further carries, in the higher layer service notification message, primary channel information of the service channel; and in this embodiment, it is assumed that the primary channel information indicates that the primary channel is a channel with a channel number M1, and the channel corresponding to the channel number M1 occupies all or a part of the bandwidth of the channel corresponding to the channel number N.

For another example: it is predefined that in a channel including a plurality of 10 MHz or 20 MHz channel bandwidths, each 10 MHz or 20 MHz bandwidth channel has a corresponding channel number, and the 10 MHz or 20 MHz bandwidth channel having the smallest, the largest or the middle channel number is taken as the primary channel. Still taking the channel number of the service channel being N, the service channel includes two channels of 10 MHz bandwidth corresponding to channel numbers M1 and M2 respectively as an example, when M1<M2, if it is predefined that the channel with the smallest channel number is the primary channel, then the channel corresponding to the channel number M1 is the primary channel, or if the channel with the largest channel number is the primary channel, then the channel corresponding to the channel number M2 is the primary channel.

In an illustrative example, it is assumed that the first device transmits a first higher layer service notification message, and indicates service A and the service channel N where service A is located in the first higher layer service notification message. Then, the first device will access the channel N or a channel included in the channel N by EDCA, and transmit data packet 1 bearing service A. In this embodiment, the indication information carried in the data packet is a value corresponding to the service channel, i.e., channel N, where service A is located. Taking the indication information being represented by 3 bits as an example, definitions of the 3 bits are as shown in Table 1. It should be noted that the definitions shown in Table 1 are only examples and are not intended to limit the scope of the present application. In this embodiment, it is assumed that the service channel N where service A is located is CH175, the primary channel of the service channel N is CH174, and the first device monitors the channel on CH175, only when the primary channel CH174 is idle, the first device is on CH174 and transmits data packet 1 encapsulated with a service 1. The indication information in the data packet is set to 001, corresponding to the channel CH175.

TABLE 1

| Bits 0-2 of indication information | Definition |
| --- | --- |
| 000 | CH174 |
| 001 | CH175 |
| 010 | CH176 |
| 011 | CH180 |
| 100 | CH181 |
| 101 | CH182 |
| 110~111 | Reserved |

In an illustrative example, it is assumed that the first device transmits a first higher layer service notification message, and indicates service A and the service channel N where service A is located in the first higher layer service notification message. In this embodiment, if data packet 1 bearing service A is to be transmitted by the device, the device sets the indication information in data packet 1 to a value corresponding to the service channel, i.e., channel N, where service A is located. When detecting that a partial bandwidth (assuming that a channel number corresponding to the partial bandwidth is M) in the channel N is idle, the device sets the bandwidth information in data packet 1 to a value corresponding to the channel number M, and transmits a data part of data packet 1 on the channel corresponding to the channel number M; and when detecting that the full bandwidth of channel N is idle, the device sets the bandwidth information in data packet 1 to a value corresponding to the channel N, and transmits the data part of data packet 1 on the channel N. Taking the bandwidth information of 3 bits as an example, definitions of the 3 bits are as shown in Table 2. It should be noted that the definitions shown in Table 2 are only examples and are not intended to limit the scope of the present application. In this embodiment, assuming that the service channel N where service A is located is CH175, and data packet 2 bearing service A is to be transmitted by the device, then the device sets the indication information in data packet 2 to 001 (taking the definition in Table 1 as an example). When detecting that CH174 is idle, the device sets the bandwidth information in the data packet to 000, which, as shown in Table 2, is configured to indicate that the device will transmit data packet 2 on a 10 MHz bandwidth corresponding to CH174.

TABLE 2

| Bits 0-2 of indication information | Definition |
| --- | --- |
| 000 | 10 MHz on CH174 |
| 001 | 20 MHz on CH175 |
| 010 | 10 MHz on CH176 |
| 011 | 10 MHz on CH180 |
| 100 | 20 MHz on CH181 |
| 101 | 10 MHz on CH182 |
| 111 | Reserved |

Figure 6:
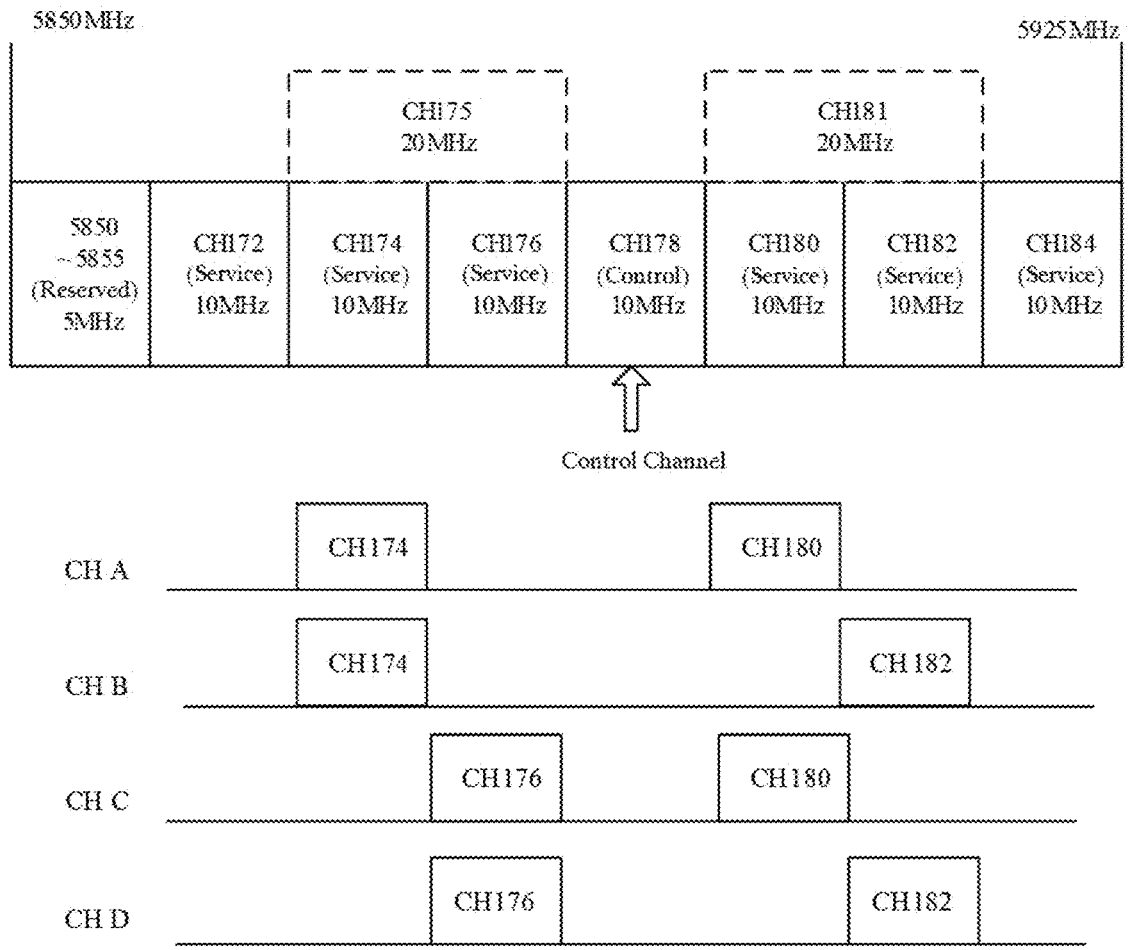
FIG. 6 is a schematic diagram showing a division embodiment in which one channel number corresponds to multiple channels according to the present application.

In an illustrative example, the channel division supports division of channels of discontinuous 20 MHz or 40 MHz bandwidth. Taking a 20 MHz bandwidth as an example, as shown in FIG. 6, channels CHA-CHD are 20 MHz channels, including bandwidths of discontinuous 10 MHz bandwidth channels. For example: channel CHA includes channel CH174 and channel CH180. For another example: channel CHD includes channel CH176 and channel CH182, so on and so forth. In this case, the first device transmits a first higher layer service notification message to notify of the first service and a service channel where service A is located. The service channel may be one or more of channels CHA to CHD. The value of the indication information contained in the data packet bearing the first service and transmitted from the first device indicates a channel number or a channel, and the channel corresponding to the channel number or the channel may be the service channel corresponding to the first service. Taking the indication information represented by 4 bits as an example, the indication information of 4 bits is as shown in Table 3. It should be noted that the definitions shown in Table 3 are only examples and are not intended to limit the scope of the present application.

TABLE 3

| Bits 0-3 of indication information | Definition |
| --- | --- |
| 0000 | CH174 |
| 0001 | CH175 |
| 0010 | CH176 |
| 0011 | CH180 |
| 0100 | CH181 |
| 0101 | CH182 |
| 0110 | CH A |
| 0111 | CH B |
| 1000 | CH C |
| 1001 | CH D |
| 1010~1111 | Reserved |

The present application further provides a service processing method, including: receiving a data packet by a second device; and determining, by the second device according to indication information carried in a signaling part of the received data packet, whether the data packet bears a second service or not.

It should be noted that the second service here may be, but is not limited to, a service that is required or of interest or wanted by the second device.

Figure 7:
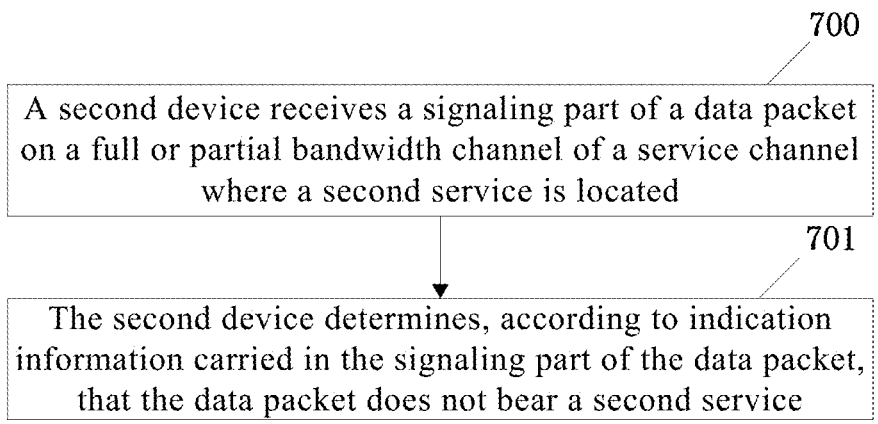
FIG. 7 is a flowchart of an embodiment of another service processing method according to the present application.

FIG. 7 is a flowchart of an embodiment of a service processing method according to the present application. As shown in FIG. 7, the method includes the following operations 700 to 701.

At operation 700: a second device receives a signaling part of a data packet on a full or partial bandwidth channel of a service channel where a second service is located.

In an illustrative example, the signaling part of the data packet carries indication information for indicating a third service borne in the data packet.

In an illustrative example, the data packet includes a data part in which the third service is borne.

In an illustrative example, the indication information may include any one or any combination of:

channel information, service identity information, partial service identity information, device identity information, and partial device identity information.

In an illustrative example, the channel information is configured to indicate a channel number of a service channel where the third service is located or the service channel.

In an illustrative example, the third service and the information on the service channel where the third service is located may be acquired through notification of a higher layer service notification message.

In an illustrative example, the service identity information is: a service identity of the third service.

In an illustrative example, the partial service identity information may be generated from the service identity of the third service. At this time, it is considered that the partial service identity information is matched with the service identity of the third service. It should be noted here that the generation may be implemented by a method in the related art, for example, generating the partial service identity from the service identity of the third service through a functional relationship, or determining the partial service identity to be lower N bits or higher N bits (N is an integer value) of the service identity of the third service, or the like. The specific generation method is not intended to limit the protection scope of the present application, and is not elaborated here.

In an illustrative example, the device identity information is: a device identity of a third device transmitting the third service.

In an illustrative example, the partial device identity information may be generated by transmitting the device identity of the third device. At this time, it is considered that the partial device identity information is matched with the device identity. It should be noted here that the generation may be implemented by a method in the related art, for example, generating the partial device identity from the device identity of the third device through a functional relationship, or determining the partial device identity to be lower N bits or higher N bits (N is an integer value) of the device identity of the third device, or the like. The specific generation method is not intended to limit the protection scope of the present application, and is not elaborated here.

In an illustrative example, before this operation, the method further includes: the second device receives a second higher layer service notification message;

and acquires, according to the received second higher layer service notification message, a service identity of the second service, and a channel number of the service channel where the second service is located.

In an illustrative example, the second higher layer service notification message may further carry: full bandwidth transmission indication and/or primary channel information. For specific implementation, please refer to the above description, which is not repeated here.

At operation 701: the second device determines, according to indication information carried in the signaling part of the data packet, that the data packet does not bear a second service.

In an illustrative example, the received data packet further carries bandwidth information, and the second device continues reception or decoding of the data part of the data packet on a bandwidth or a channel indicated by the bandwidth information.

In an illustrative example, the operation may further include: ending processing of the data packet.

In an illustrative example, ending the processing of the data packet includes:
stopping reception or decoding of the data packet;
or, discarding the data packet;
or, the second device resetting a reception mode thereof or recapturing a new data packet.

In an illustrative example, determining, according to indication information carried in the data packet, that the data packet does not bear a second service includes:
determining, under the condition that the indication information carried in the received data packet is not consistent with information of the second service, that the data packet does not bear a second service. Here, "not consistent" includes "not the same" or "not matched".

In an illustrative example, this operation further includes:
determining, under the condition that the indication information carried in the received data packet is consistent with information of the second service, that the data packet bears the second service, and continuing, by the second device, reception or decoding of the data packet. Here, "consistent" includes "the same" or "matched".

In an illustrative example, if the indication information carried by the data packet is a channel number or a service channel, then:
determining that the data packet does not bear a second service includes:
determining, under the condition that the channel or channel number indicated by the indication information carried in the data packet is not the same as the service channel or channel number of the service channel where the second service is located, that the data packet does not bear a second service.

Determining that the data packet bears a second service includes:
determining, under the condition that the channel or channel number indicated by the indication information carried in the data packet is the same as the service channel or channel number of the service channel where the second service is located, that the data packet bears the second service. Further, the method may further include: continuing reception or decoding of the rest part of the data packet, and determining again whether the data packet bears the second service according to information in the rest part of the data packet.

It should be noted that, different services may be transmitted on the same channel; that is, data packet 1 bearing service A may be transmitted through channel M, while data packet 2 bearing service B may also be transmitted through channel M, but service B and service A may be different services. Therefore, the determined same or matched channel number can only indicate that the service channel of the service borne in the received data packet is the channel corresponding to the channel number, but it cannot definitely determine that the service borne in the received data packet is the service (i.e., the second service) required or expected by the device. Therefore, it is required to continue receiving the rest part of the data packet, and determine whether the received data packet indeed bears the second service according to other information in the rest part of the subsequently received data packet, such as the service identity corresponding to the service borne in the data packet.

In an illustrative example, the information in the rest part of the data packet may include, but is not limited to, for example: a service identity corresponding to a service borne in the data packet and the like; and determining whether the data packet bears the required service according to information in the rest part of the data packet includes:
determining, if the service identity in the rest part of the data packet is the same as the service identity of the second service, that the data packet bears the second service; and determining, if the service identity in the rest part of the data packet is not the same as the service identity of the second service, that the data packet does not bear a second service.

In an illustrative example, if the indication information carried in the data packet is a value corresponding to a channel, and the value corresponds to the service channel where the second service is located, then the two are matched; and if the indication information carried in the data packet is a value corresponding to a channel, but the value does not correspond to the service channel where the second service is located, then the two are not matched.

In an illustrative example, if the indication information carried in the data packet is service identity information or partial service identity information, then:
determining that the data packet does not bear a second service includes:
determining, under the condition that the service identity information carried in the data packet is not the same as the service identity of the second service, or the partial service identity information carried in the data packet is not matched with the service identity of the second service, that the data packet does not bear a second service; and
determining that the data packet bears a second service includes:
determining, under the condition that the service identity information carried in the data packet is the same as the service identity of the second service, that the data packet bears the second service; or,
determining, under the condition that the partial service identity information carried in the data packet is matched with the service identity of the second service, that the data packet may bear the second service.

Further, the method may further include: continuing reception or decoding of the rest part of the data packet, and determining again whether the data packet bears the second service according to information in the rest part of the data packet.

It should be noted here that, when the indication information is partial service identity information, it is possible that different services correspond to the same partial service identity. Therefore, the determined partial service identity matched with the service identity of the second service can only indicate that the service borne in the received data packet may be the second service, but it cannot definitely determine that the service borne in the received data packet is the second service. Therefore, it is required to continue receiving the rest part of the data packet, and determine whether the received data packet indeed bears the second service according to other information in the rest part of the subsequently received data packet, such as the service identity corresponding to the service borne in the data packet.

In an illustrative example, the information in the rest part of the data packet may include, but is not limited to, for example: a service identity corresponding to a service borne in the data packet and the like; and determining whether the data packet bears the second service according to information in the rest part of the data packet includes:

determining, if the service identity in the rest part of the data packet is the same as the service identity of the required service, that the data packet bears the second service; and determining, if the service identity in the rest part of the data packet is not the same as the service identity of the second service, that the data packet does not bear a second service.

In an illustrative example, if the partial service identity information carried in the data packet is generated from the service identity of the second service, then the two are matched; and if the partial service identity information carried in the data packet cannot be generated from the service identity of the second service, then the two are not matched.

In an illustrative example, if the indication information carried in the data packet is device identity information or partial device identity information, then:

determining that the data packet does not bear a second service includes:
determining, under the condition that the device identity information carried in the data packet is not the same as the device identity of the device transmitting the second higher layer service notification message notifying of the second service, or the partial device identity information carried in the data packet is not matched with the device identity of the device transmitting the second higher layer service notification message notifying of the second service, that the data packet does not bear a second service.

Determining that the data packet bears a second service includes:
determining, under the condition that the device identity information carried in the data packet is the same as the device identity of the device transmitting the second higher layer service notification message notifying of the second service, that the data packet bears the second service; or,
determining, under the condition that the partial device identity information carried in the data packet is matched with the device identity of the device transmitting the second higher layer service notification message notifying of the second service, that the data packet may bear the second service, continuing reception or decoding of the rest part of the data packet, and determining again whether the data packet bears the second service according to information in the rest part of the data packet.

It should be noted here that, when the indication information is partial device identity information, it is possible that different devices have the same partial device identity information. Therefore, the determined partial device identity information carried in the data packet matched with the device identity of the device transmitting the second higher layer service notification message notifying of the second service can only indicate that the received data packet may bear the second service, but it cannot definitely determine that the service borne in the received data packet is the second service. Therefore, it is required to continue receiving the rest part of the data packet, and determine whether the received data packet indeed bears the second service according to other information in the rest part of the subsequently received data packet, such as the service identity corresponding to the service borne in the data packet.

In an illustrative example, the information in the rest part of the data packet may include, but is not limited to, for example: a service identity corresponding to a service borne in the data packet and the like; and determining whether the data packet bears the second service according to information in the rest part of the data packet includes:

determining, if the service identity in the rest part of the data packet is the same as the service identity of the required service, that the data packet bears the second service; and determining, if the service identity in the rest part of the data packet is not the same as the service identity of the required service, that the data packet does not bear a second service.

In an illustrative example, if the partial device identity information carried in the data packet is generated from the device identity of the device transmitting the second higher layer service notification message notifying of the second service, then the two are matched; and if the partial device identity information carried in the data packet cannot be generated from the device identity of the device transmitting the second higher layer service notification message notifying of the second service, then the two are not matched.

In the service processing method of the present application shown in FIG. 7, by carrying in the received data packet indication information indicating a second service borne in the data packet, correct differentiation of the current service is achieved and it is guaranteed that a service receiver correctly receives the second service.

An embodiment of the present disclosure further provides a computer-readable storage medium with computer executable instructions stored thereon. The computer executable instructions are configured to cause any of the above service processing methods described with reference to FIG. 7 to be implemented.

An embodiment of the present disclosure further provides an apparatus for implementing service processing, including a processor and a memory. The memory has stored thereon a computer program executable on the processor and configured to: cause any of the above service processing methods described with reference to FIG. 7 to be implemented.

The following describes the specific process of receiving a data packet by the second device in conjunction with several embodiments.

In a first embodiment, it is assumed that the device receives a higher layer service notification message and learns that the channel number of the service channel where the service A is located is N. If the device receives data packet 1 and obtains a value "a" of the indication information carried in data packet 1, the value "a" indicates a channel number M, and the channel number M is the same as the service channel number N of the service channel where service A is located, the service channel number N being carried in the received higher layer service notification message, then the WAVE device will continue receiving or decoding data packet 1, and further determine whether data packet 1 indeed bears service A according to other information in the rest part of the subsequently received data packet 1, such as the service identity corresponding to the service borne in the data packet.

For example: device 2 receives a higher layer service notification message and determines from the higher layer service notification message that service A is borne on channel CH175. When device 2 receives data packet 1, as shown in Table 1, the value 001 of the indication information in data packet 1 corresponds to the channel number CH175, which is matched with the service channel CH175 of service A notified in the higher layer service notification message. However, different services may be located on the same service channel CH175. That is, while the data containing service A will be transmitted on channel CH175, other services (which may not be service A) in data packet 1 may also be transmitted on channel CH175. Therefore, the determined matched channel number can only indicate that the service channel of the service borne in data packet 1 is CH175, but it cannot definitely determine that the service borne in the data packet 1 is service A. Therefore, device 2 will continue receiving or decoding the data packet 1, and further determine whether data packet 1 bears service A according to other information in the rest part of data packet 1, such as the service identity corresponding to the service borne in data packet 1. That is, according to the indication information, it may be pre-determined that the service may be service A, and the device 2 continues receiving or decoding the rest part of the data packet.

Figure 8:
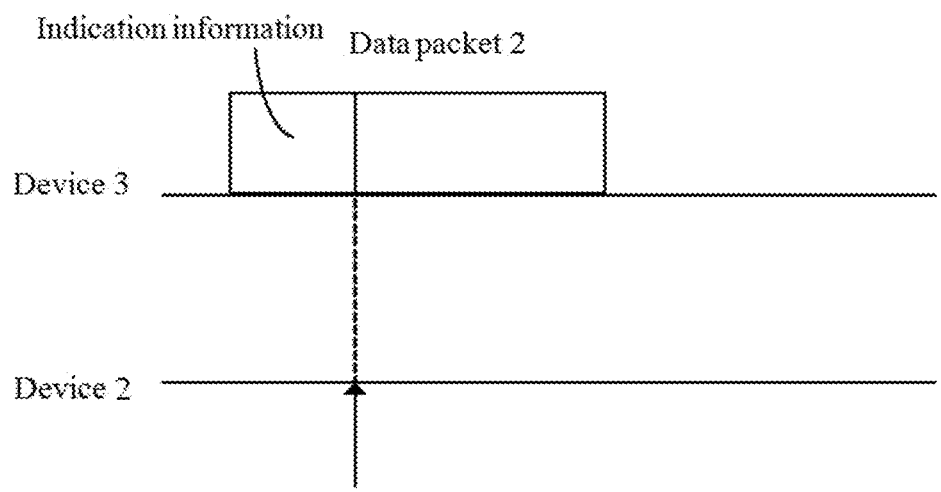
FIG. 8 is a schematic diagram showing reception of a data packet according to a second embodiment of the present application.

In a second embodiment, it is assumed that the device receives a higher layer service notification message and learns that the channel number of the service channel where the service A is located is N. The device receives the data packet on the full or partial channel corresponding to the service channel number N. If the device receives data packet 2 and obtains a value "b" of the indication information carried in data packet 2 indicating a channel number M1, and the channel number M1 is not the same as or matched with the service channel N of the service channel where service A is located, the service channel N being notified in the received higher layer service notification message, then, the device determines that data packet 2 does not bear service A, and thus discards data packet 2 or resets a reception mode of the device to receive a new data packet. For example: device 1 notifies, in the first higher layer service notification message transmitted from the device 1, that the service channel where service 1 is located is CH175; and device 3 notifies, in the second higher layer service notification message transmitted from the device 3, that the service channel where service 2 is located is CH174. The channel corresponding to CH174 is a part of channel CH175. Device 2 receives the first higher layer service notification and finds that device 2 is interested in service 1, and thus receives the data packet on the full or partial channel of CH175. As shown in FIG. 8, if device 2 receives data packet 2 or a signaling part thereof, and obtains a value "a" of the indication information indicating a channel number M being CH174, since the channel number M is not the same as or matched with the service channel CH175 where service 1 located, it is determined that that data packet 2 does not bear service 1. Then, device 2 stops receiving data packet 2, or discards the rest part of data packet 2, or resets a reception mode of device 2 to capture a new data packet.

In a third embodiment, it is assumed that the service channel where service 1 is located is channel N; and the service channel where service 2 is located is channel M1. The channel N includes partial channel bandwidths corresponding to channel numbers M1 and M2, respectively.

In the third embodiment, device 1 monitors the channel N. When the channel M1 is idle and the channel M2 is busy, device 1 accesses the channel M1 and transmits data packet 1 bearing service 1 on the channel M1. The indication information carried in data packet 1 is set to "a", indicating the channel N.

Device 3 receives a higher layer service notification message and learns that the service channel where the service 2 is located is M1. When device 3 receives data packet 1, since the value "a" of the indication information in data packet 1 corresponds to a channel that is not matched with the channel number M1 of the service channel where the desired service 2 is located, device 3 stops receiving or discards the rest part of data packet 1. When device 3 receives data packet 2, since the value "b" of the indication information in data packet 2 corresponds to the channel number M1, which is matched with the channel number M1 of the service channel where service 2 is located, device 3 continues reception or decoding of the rest part of data packet 2, and further determines whether data packet 2 contains service 2 according to other information.

Figure 9:
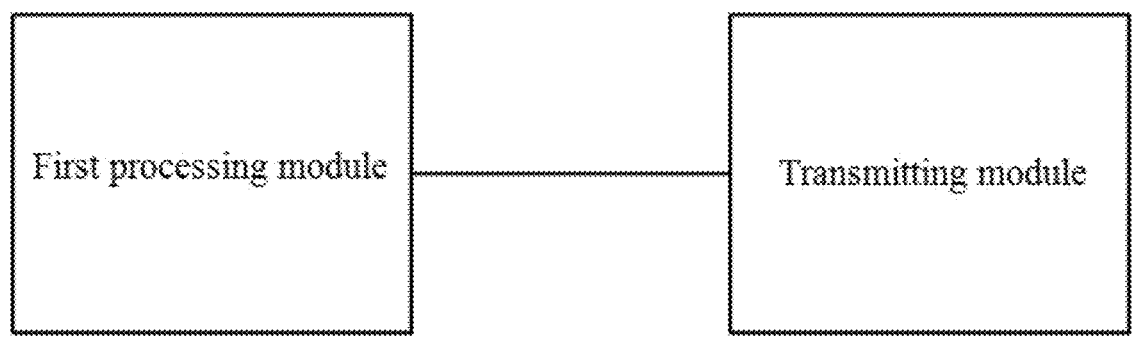
FIG. 9 is a schematic diagram showing an architecture of a device according to the present application.

FIG. 9 is a schematic diagram showing an architecture of an Internet of Vehicles device according to the present application; and as shown in FIG. 9, the device includes at least: a first processing module and a transmitting module. The first processing module is configured to carry indication information in a signaling part of a data packet, the indication information indicating that a first service is borne in a data part of the data packet; and the transmitting module is configured to transmit the data packet.

In an illustrative example, the transmitting module is further configured to: transmit a first higher layer service notification message. The first higher layer service notification message carries a service identity of the first service, and a channel number of the service channel where the first service is located.

In an illustrative example, the first higher layer service notification message further carries: full bandwidth/partial bandwidth transmission indication configured to indicate whether the data packet bearing the first service is transmitted on full bandwidth or partial bandwidth of the service channel of the first service.

In an illustrative example, the first higher layer service notification message of the present application further carries: primary channel information configured to indicate a primary channel of the service channel notified in the first higher layer service notification message.

Figure 10:
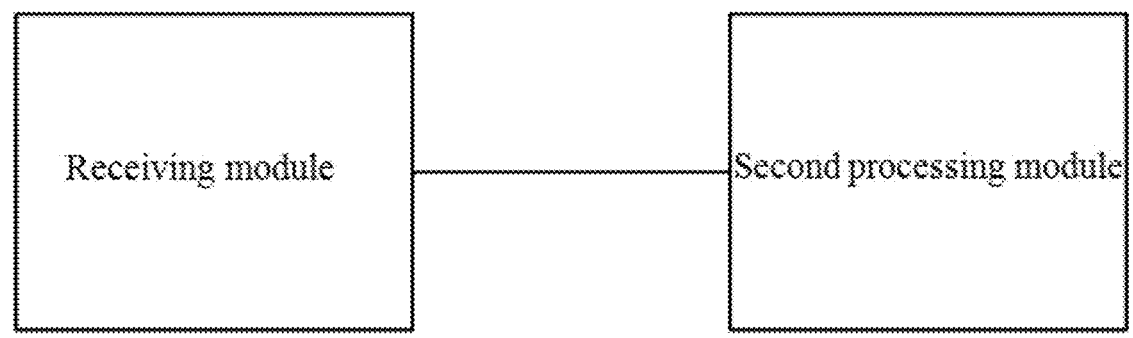
FIG. 10 is a schematic diagram showing an architecture of another device according to the present application.

FIG. 10 is a schematic diagram showing an architecture of another Internet of Vehicles device according to the present application. As shown in FIG. 10, the device includes at least: a receiving module and a second processing module. The receiving module is configured to receive a data packet; and the second processing module is configured to determine, according to indication information carried in a signaling part of the data packet, whether the data packet bears a second service or not.

It should be noted that the second service here may be, but is not limited to, a service that is required or of interest or wanted by the second device.

In an illustrative example, the receiving module is further configured to:
- receive a second higher layer service notification message; and
- acquire, according to the received second higher layer service notification message, a service identity of the second service, and a channel number of the service channel where the second service is located.

In an illustrative example, the second higher layer service notification message may further carry: full bandwidth/partial bandwidth transmission indication and/or primary channel information.

In an illustrative example, the second processing module is specifically configured to:
- determine, under the condition that the indication information carried in the received data packet is not consistent with information of the second service, that the data packet does not bear a second service. Here, "not consistent" includes "not the same" or "not matched".

When the indication information carried in the received data packet is consistent with information of the second service, it is determined that the data packet bears the second service, and the second device continues reception or decoding of the data packet. Here, "consistent" includes "the same" or "matched".

The present application further provides an Internet of Vehicles device, including any one of the Internet of Vehicles devices shown in FIG. 9 or any one of the Internet of Vehicles devices shown in FIG. 10.

The Internet of Vehicles device notifies of service-related information in a higher layer service notification message. The service-related information mainly includes: a service identity and a channel number. The channel number is a channel identity of the service channel where the service corresponding to the service identity is located. The present application further provides a service processing method, including:
- carrying, by an Internet of Vehicles device in a higher layer service notification message, full bandwidth/partial bandwidth transmission indication configured to indicate that the notified service bearing the higher layer service notification message is transmitted on full bandwidth or partial bandwidth of a service channel where the service is located.

Further, in an illustrative example, when the full bandwidth/partial bandwidth transmission indication indicates transmitting on a partial channel, the data packet bearing the service may be transmitted on a partial bandwidth channel of the channel where the service is located.

In an illustrative example, when the full bandwidth transmission indication is set to "a", it indicates that the data packet bearing the service is transmitted in a full bandwidth manner on the service channel corresponding to the service; and when the full bandwidth transmission indication is set to "b", it indicates that the data packet bearing the service can be transmitted on a partial bandwidth of the service channel corresponding to the service. For example, when the service channel of a certain service has a bandwidth of 20 MHz, the data packet bearing the service may be transmitted on a certain 10 MHz bandwidth of the 20 MHz bandwidth channel.

The service channel where the service is located may include one or more channels of e.g., 10 MHz or 20 MHz bandwidth. When the service channel includes a plurality of channels of 10 MHz or 20 MHz bandwidth, the inventor of the present application proposes: one of the channels of 10 MHz or 20 MHz bandwidth can be designated as a primary channel.

The present application further provides a service processing method, including: carrying, by an Internet of Vehicles device in a higher layer service notification message, primary channel information configured to indicate a primary channel of a service channel, a service notified in the higher layer service notification message being located in the service channel.

The primary channel is a common channel of a transmitter transmitting the data packet bearing the service and a receiver receiving the data packet bearing the service.

For example: device 1 notifies, in the higher layer service notification message, of the channel number N of the service channel where service 1 is located, and primary channel information of the service channel. In this embodiment, it is assumed that the primary channel information indicates that the primary channel is a channel with a channel number M1, and the channel corresponding to the channel number M1 occupies a part of the bandwidth of the channel corresponding to the channel number N.

For another example: in a channel including a plurality of 10 MHz or 20 MHz channel bandwidths, each 10 MHz or 20 MHz bandwidth channel has a corresponding channel number. It is predefined that the 10 MHz or 20 MHz bandwidth channel having the smallest, the largest or the middle channel number is taken as the primary channel. Still taking the channel number of the service channel being N, the service channel includes two channels of 10 MHz bandwidth corresponding to channel numbers M1 and M2 respectively as an example, when M1<M2, if it is predefined that the channel with the smallest channel number is the primary channel, then the channel corresponding to the channel number M1 is the primary channel, or if it is predefined that the channel with the largest channel number is the primary channel, then the channel corresponding to the channel number M2 is the primary channel.

The above are only the preferred examples of the present disclosure and not intended to limit the scope of the present disclosure. Any amendments, equivalent substitutions, improvements, etc. within the principle of the disclosure are all included in the scope of the protection defined by the appended claims of the disclosure.

What is claimed is:

1. A service processing method for vehicular communication, comprising:
   carrying, by a first device, indication information in a signaling part of a data packet, the indication information indicating that a first service is borne in a data part of the data packet; and
   transmitting the data packet through the first device;
   wherein the method further comprises:
   transmitting, by the first device, a first higher layer service notification message,
   wherein the first higher layer service notification message carries full bandwidth transmission indication; when the full bandwidth transmission indication indicates transmitting on a partial channel, the data packet bearing the first service is allowed to be transmitted on a partial channel bandwidth of a service channel of the first service, and wherein only the partial channel bandwidth in the service channel of the first service is idle.

2. The method according to claim 1, wherein the indication information comprising at least one of:

channel information, service identity information, partial service identity information, device identity information, or partial device identity information.

3. The method according to claim 1, wherein the indication information comprises channel information, and the channel information is configured to indicate a service channel where the first service is located or a channel number of the service channel where the first service is located.

4. The method according to claim 1, wherein
the indication information comprises service identity information, and the service identity information is a service identity of the first service; or,
the indication information comprises partial service identity information, and the partial service identity information is generated from the service identity of the first service; or,
the indication information comprises device identity information, and the device identity information is a device identity of the first device; or,
the indication information comprises partial device identity information, and the partial device identity information is generated from the device identity of the first device.

5. The method according to claim 1, wherein the first service and the information on the service channel where the first service is located are acquired through a higher layer service notification message.

6. The method according to claim 1, wherein the signaling part of the data packet further carries bandwidth information, and the bandwidth information is configured to indicate a transmission bandwidth or a transmission channel used by the data part of the data packet.

7. The method according to claim 1, further comprising:
transmitting, by the first device, a first higher layer service notification message; wherein the first higher layer service notification message carries a service identity of the first service, and a channel number of a service channel where the first service is located;
wherein the first higher layer service notification message further carries full bandwidth or partial bandwidth transmission indication that is configured to indicate whether the data packet bearing the first service is transmitted on full bandwidth or partial bandwidth of the service channel of the first service, or
wherein the first higher layer service notification message further carries primary channel information that is configured to indicate a primary channel of the service channel where the first service is located.

8. An Internet of Vehicles device, comprising a processor and a memory, wherein the memory has stored thereon a computer program executable on the processor: the computer program, when executed by the processor, causes the service processing method according to claim 1 to be implemented.

9. A service processing method for vehicular communication, comprising:
receiving a data packet by a second device; and
determining, by the second device according to indication information carried in a signaling part of the data packet, whether the data packet bears a second service or not;
wherein the method further comprises:
receiving, by the second device, a second higher layer service notification message, wherein the second higher layer service notification message carries full bandwidth transmission indication; when the full bandwidth transmission indication indicates transmitting on a partial channel, the data packet bearing the second service is allowed to be transmitted on a partial channel bandwidth of a service channel of the second service, and wherein only the partial channel bandwidth in the service channel of the second service is idle.

10. The method according to claim 9, wherein before receiving the data packet by the second device, the method further comprises:
receiving, by the second device, a second higher layer service notification message; and
acquiring, according to the received second higher layer service notification message, a service identity of the second service, and a channel number of the service channel where the second service is located.

11. The method according to claim 9, wherein the indication information comprising at least one of:
channel information, service identity information, partial service identity information, device identity information, or partial device identity information.

12. The method according to claim 9, wherein
the indication information comprises channel information, and the channel information is configured to indicate a service channel where the service borne in the data packet is located or a channel number of the service channel; or,
the indication information comprises service identity information, and the service identity information is a service identity of the service borne in the data packet; or,
the indication information comprises partial service identity information, and the partial service identity information is generated from the service identity of the service borne in the data packet; or,
the indication information comprises device identity information, and the device identity information is a device identity of a device for the service borne in the data packet; or,
the indication information comprises partial device identity information, and the partial device identity information is generated from the device identity of the device for the service borne in the data packet.

13. The method according to claim 9, wherein determining, according to indication information carried in the signaling part of the data packet, that the data packet bears a second service comprises:
determining that the data packet bears the second service under the condition that the service channel indicated by the indication information is the same as the service channel where the second service is located, or the channel number of the service channel indicated by the indication information is the same as the channel number of the service channel where the second service is located; or,
determining that the data packet bears the second service under the condition that the service identity indicated by the indication information is the same as the service identity of the second service or the partial service identity indicated by the indication information is matched with the service identity of the second service; or,
determining that the data packet bears the second service under the condition that the device identity indicated by the indication information is the same as the device identity of the device transmitting the second service, or the partial device identity indicated by the indication information is matched with the device identity of the device transmitting the second service.

14. The method according to claim 9, wherein determining, according to indication information carried in the data packet, that the data packet does not bear a second service comprises:
   determining that the data packet does not bear a second service under the condition that the service channel indicated by the indication information is not the same as the service channel where the second service is located, or the channel number of the service channel indicated by the indication information is not the same as the channel number of the service channel where the second service is located; or,
   determining that the data packet does not bear a second service under the condition that the service identity or partial service identity indicated by the indication information is not the same as the service identity of the second service, or that the partial service identity indicated by the indication information is not matched with the service identity of the second service; or,
   determining that the data packet does not bear a second service under the condition that the device identity or partial device identity indicated by the indication information is not the same as the device identity of the device transmitting the second service, or the partial device identity indicated by the indication information is not matched with the device identity of the device transmitting the second service.

15. The method according to claim 9, wherein the signaling part of the data packet further carries bandwidth information, and the data part of the data packet is received on a transmission bandwidth or transmission channel indicated by the bandwidth information.

16. The method according to claim 9, wherein after determining, by the second device according to indication information carried in the data packet, that the data packet does not bear a second service, the method further comprises: ending processing of the data packet; wherein
   ending the processing of the data packet comprises one of:
   stopping reception or decoding of the data packet;
   discarding the data packet; or
   the second device resetting a reception mode of the second device or recapturing a new data packet.

17. The method according to claim 9, wherein after determining, by the second device according to indication information carried in the data packet, that the data packet bears a second service, the method further comprises:
   continuing reception or decoding of the rest part of the data packet, and determining again whether the data packet bears the second service according to information in the rest part of the data packet.

18. The method according to claim 17, wherein
   the information in the rest part of the data packet comprises: a service identity corresponding to a service borne in the data packet; and
   determining again whether the data packet bears the second service according to information in the rest part of the data packet comprises:
   determining again, under the condition that the service identity in the rest part of the data packet is the same as the service identity of the second service, that the data packet bears the second service; and determining, under the condition that the service identity in the rest part of the data packet is not the same as the service identity of the second service, that the data packet does not bear the second service.

19. An Internet of Vehicles device, comprising a processor and a memory, wherein the memory has stored thereon a computer program executable on the processor: the computer program, when executed by the processor, causes the service processing method according to claim 11 to be implemented.

20. A service processing method for vehicular communication, comprising:
   carrying, by a device in a higher layer service notification message, full bandwidth or partial bandwidth transmission indication, the full bandwidth or partial bandwidth transmission indication being configured to indicate whether a service bearing the higher layer service notification is transmitted on full bandwidth or partial bandwidth of a service channel thereof;
   when the full bandwidth transmission indication indicates transmitting on a partial channel, the data packet bearing the first service is allowed to be transmitted on a partial channel bandwidth of a service channel of the first service, and wherein only the partial channel bandwidth in the service channel of the first service is idle.

\* \* \* \* \*